S. P. BAHNSEN.
TONNAGE RECORDER FOR SHIPS.
APPLICATION FILED MAR. 8, 1919.
1,409,914.
Patented Mar. 21, 1922.
6 SHEETS—SHEET 1.
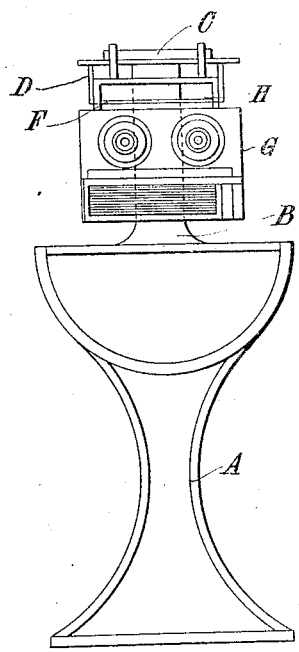
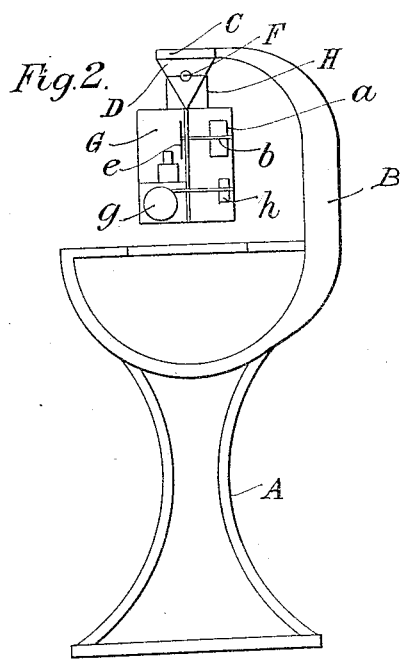
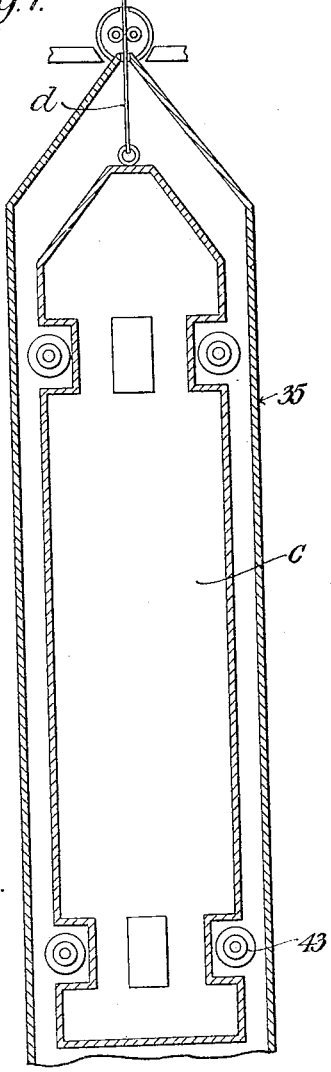
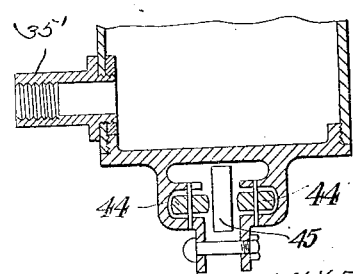
INVENTOR:
Sophus P. Bahnsen
By Wm Wallace White
ATTY.

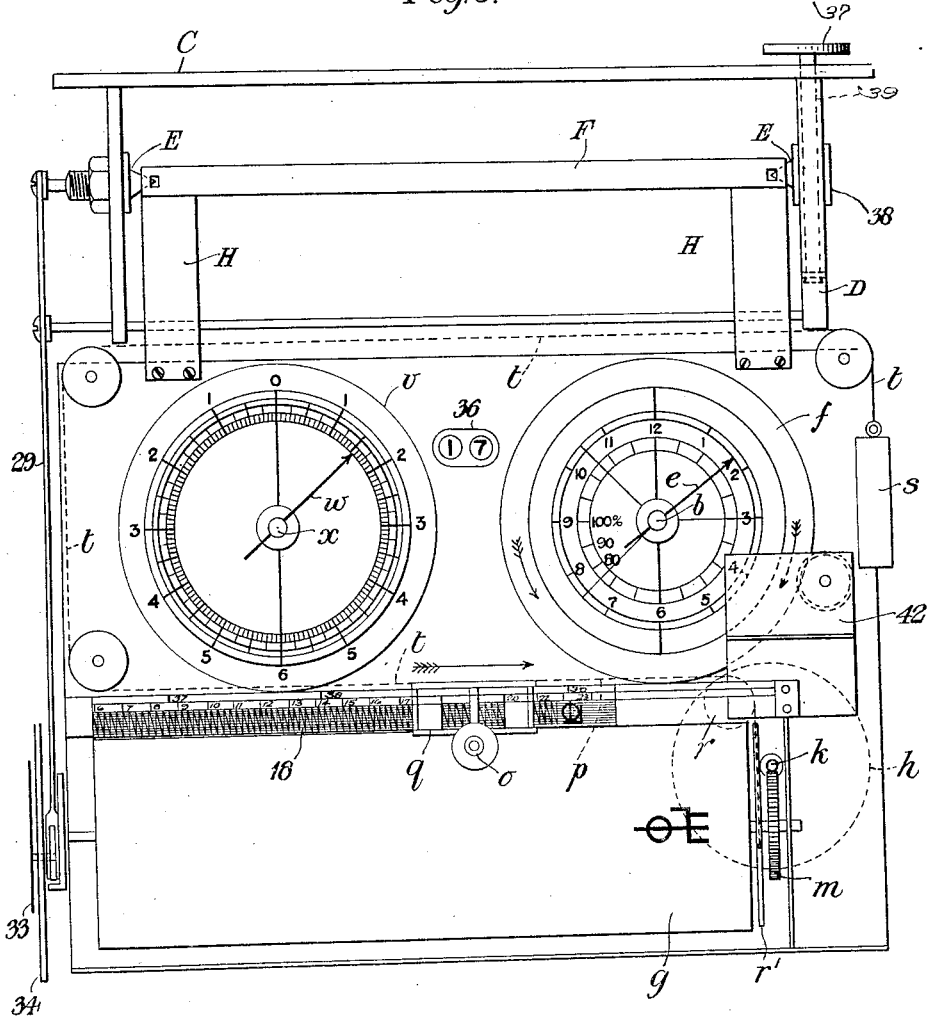

S. P. BAHNSEN.
TONNAGE RECORDER FOR SHIPS.
APPLICATION FILED MAR. 8, 1919.
1,409,914.
Patented Mar. 21, 1922.
6 SHEETS—SHEET 3.
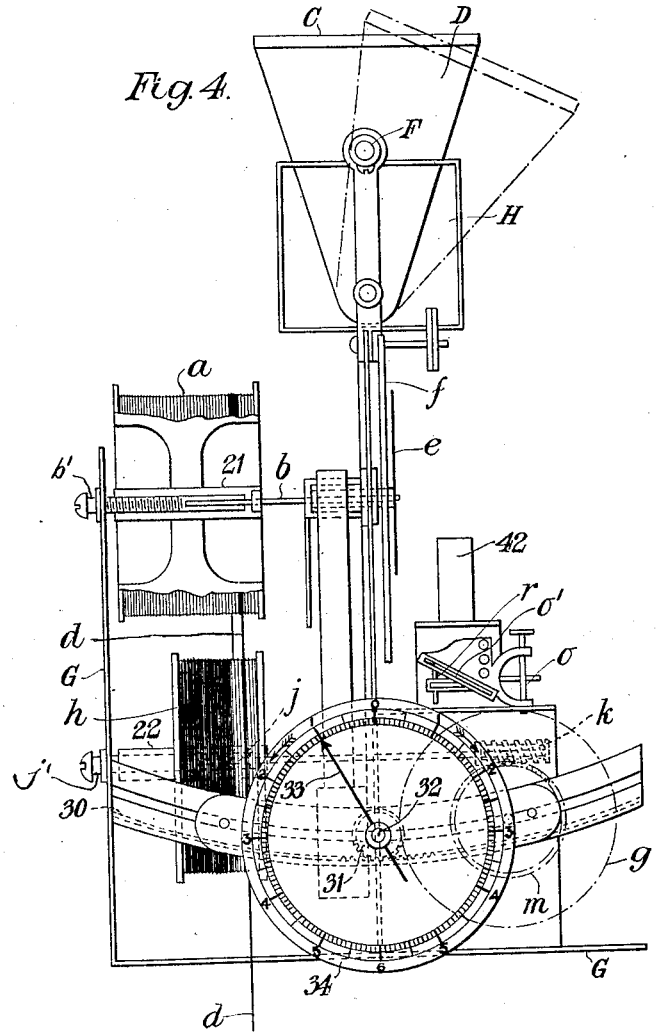
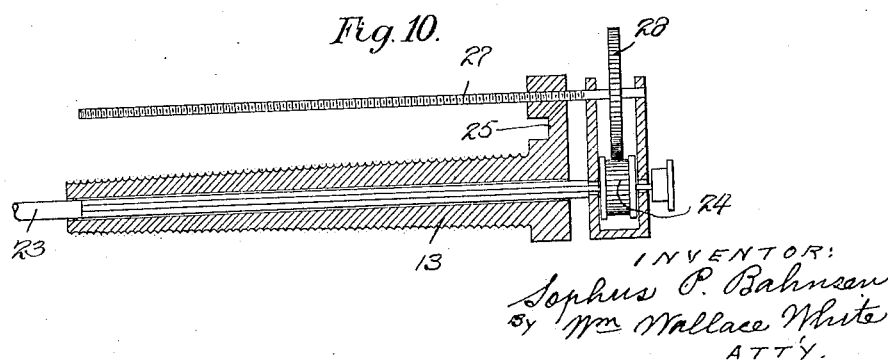

S. P. BAHNSEN.
TONNAGE RECORDER FOR SHIPS.
APPLICATION FILED MAR. 8, 1919.

1,409,914.

Patented Mar. 21, 1922.
6 SHEETS—SHEET 4.

INVENTOR:
Sophus P. Bahnsen
BY Wm Wallace White
ATTY.

S. P. BAHNSEN.
TONNAGE RECORDER FOR SHIPS.
APPLICATION FILED MAR. 8, 1919.

1,409,914. Patented Mar. 21, 1922.
6 SHEETS—SHEET 5.

INVENTOR:
Sophus P. Bahnsen
By Wm Wallace White
ATTY.

S. P. BAHNSEN.
TONNAGE RECORDER FOR SHIPS.
APPLICATION FILED MAR. 8, 1919.

1,409,914.

Patented Mar. 21, 1922.
6 SHEETS—SHEET 6.

INVENTOR:
Sophus P. Bahnsen
By Wm Wallace White
ATTY.

UNITED STATES PATENT OFFICE.

SOPHUS PETER BAHNSEN, OF WEST HARTLEPOOL, ENGLAND.

TONNAGE RECORDER FOR SHIPS.

1,409,914.  Specification of Letters Patent.  Patented Mar. 21, 1922.

Application filed March 8, 1919. Serial No. 281,444.

*To all whom it may concern:*

Be it known that I, SOPHUS PETER BAHNSEN, of 30 South Road, West Hartlepool, in the county of Durham, England, have invented certain new and useful Improvements in Tonnage Recorders for Ships, of which the following is a specification.

This invention relates to instruments for measuring and recording the tonnage taken on board and discharged from ships. The object of this invention is to provide an efficient instrument for this purpose.

An instrument made in accordance with this invention comprises a stand, a shaft disposed longitudinally of the vessel mounted on pivotal joints on bearings on the stand, a frame suspended from the shaft, a drum on said frame disposed parallel to the shaft adapted to be rotated by the vertical movement of a float, a pencil or the like adapted to be moved longitudinally of the drum by the vertical movement of the float, so as to scribe a mark on a chart mounted on said drum.

Referring to the drawings filed herewith:

Fig. 1 is a general front elevation of one form of instrument made in accordance with this invention.

Fig. 2 is an end view.

Fig. 3 is a diagrammatic front elevation of the instrument.

Fig. 4 is an end elevation.

Figure 5:
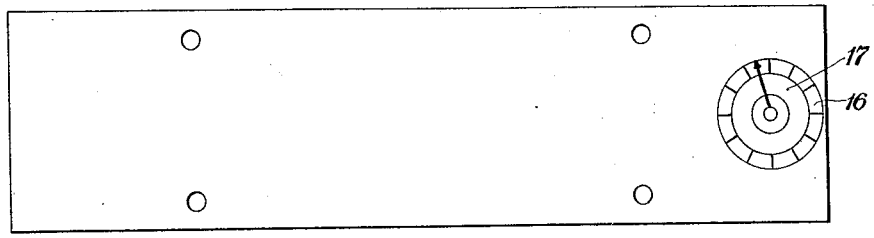
Fig. 5 is a back elevation.
Figure 5:
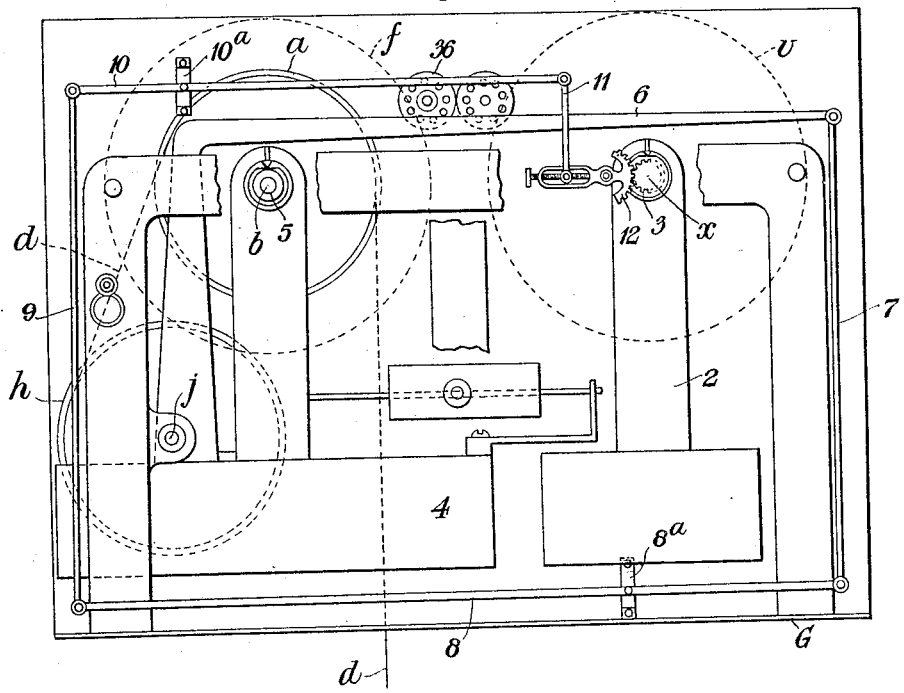

Fig. 5' is a plan view of the supporting plate of the instrument.

Figure 6:
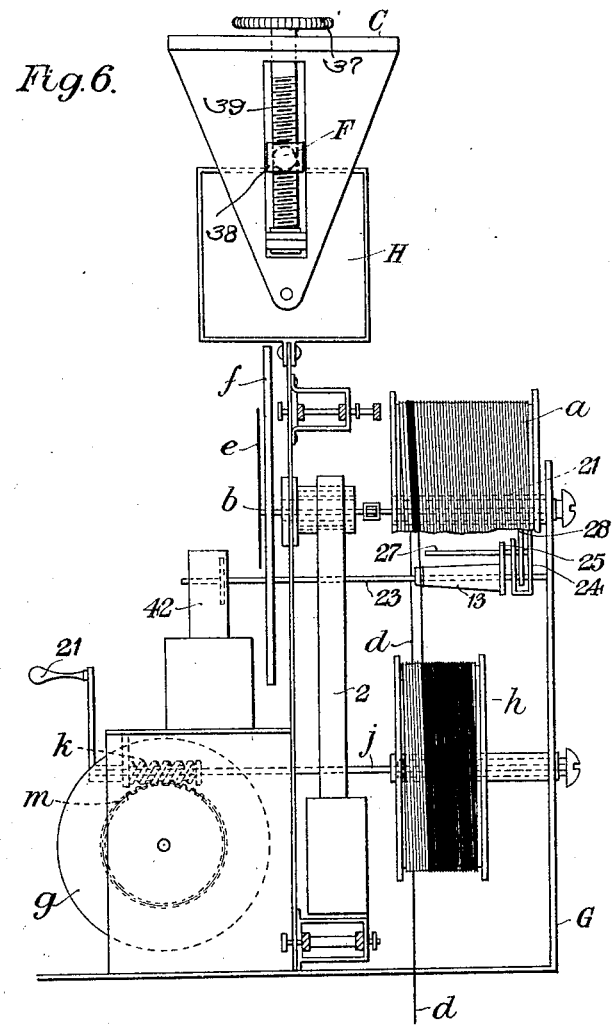

Fig. 6 is an end view opposite to that shown in Fig. 4.

Fig. 7 is a section shewing the float and pipe.

Figure 8:
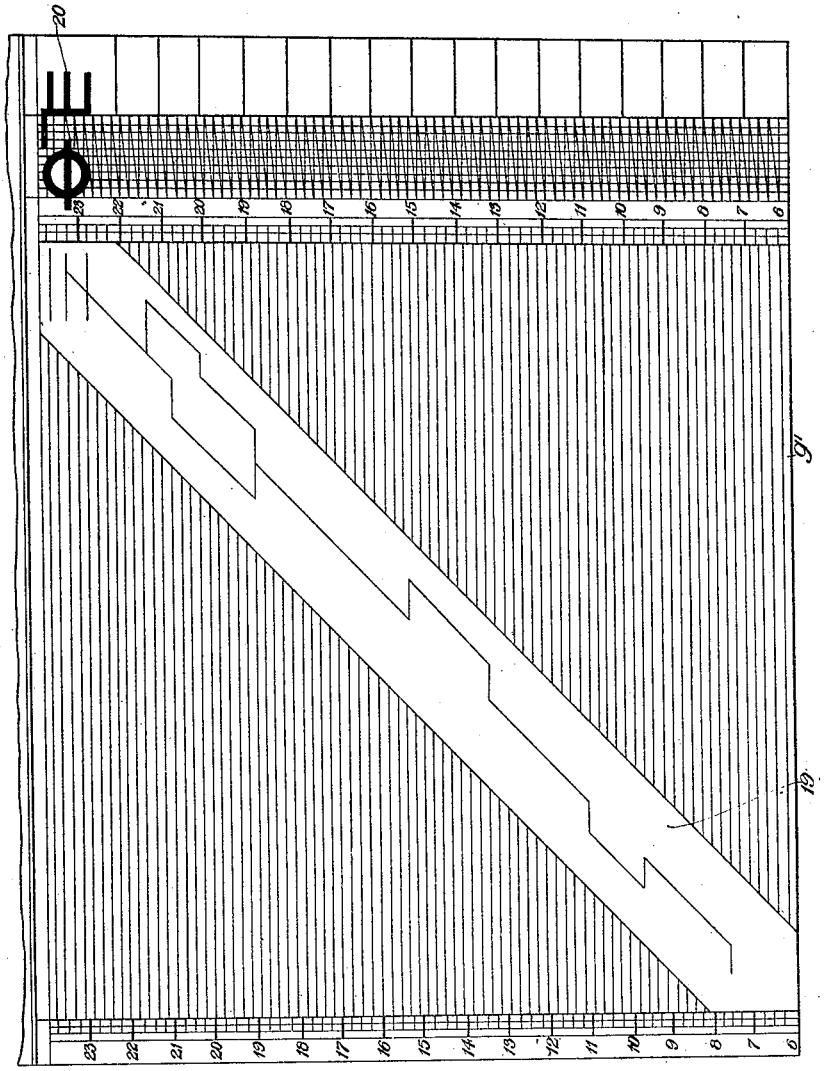

Fig. 8 is a diagram of the chart on which the record is made.

Figure 9:
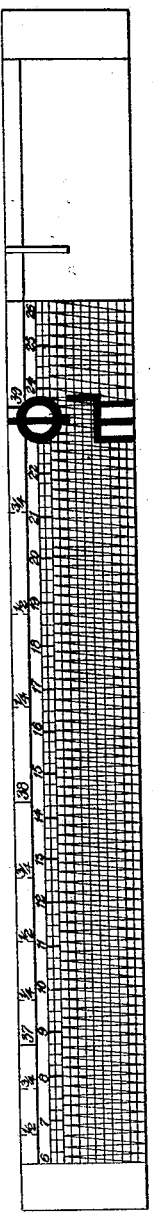

Fig. 9 is a detail of the scale mounted on the drum $g$.

Fig. 10 is a central longitudinal sectional view, on an enlarged scale, of the coned sleeve and its operating mechanism, for increasing the speed of the scale drum.

Figure 11:
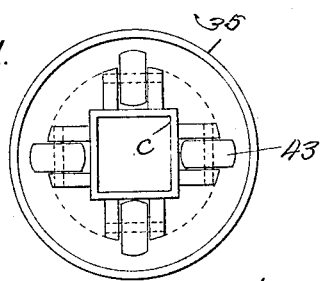

Fig. 11 is a cross-sectional view of the float and its enclosing casing.

The apparatus shewn in the drawings comprises a standard A (see Figs. 1 and 2) carrying an arm B on which is mounted a plate C from which hang iron plates D carrying centres E E. Between the centres E E is mounted a shaft F referred to hereafter as the suspension shaft from which the frame G of the instrument is suspended by the hangers H. Means is provided for vertically adjusting the shaft F with relation to the recording device hereinafter described, which adjusting means is shown in Figs. 3 and 6 and comprises a nut 38 vertically slidable in a slot in one of the end plates D and carrying one of the centers or trunnions E for the shaft F. The vertical position of the nut 38 is controlled by a screw 39 threaded through said nut and swiveled at its lower end in the plate D, said screw being provided at its upper end with a hand wheel 37. The moving parts of the instrument on the frame G comprise a drum $a$ hereinafter referred to as the float drum, mounted on a spindle $b$ a float $c$ suspended from the drum by a cord $d$ which may be termed the load line cord adapted to take one or two turns on to the drum $a$ and to be kept taut by a counter balance weight or other suitable means as the vessel falls in the water. A pointer $e$ attached to the spindle $b$ of the float drum travels over a dial $f$ hereinafter referred to as the dead weight scale dial to indicate the load and the maximum load allowable according to Lloyds Register or any other British or Foreign Register depending on the density of the water, and on the summer, Indian summer or Winter North Atlantic marks as indicated on the chart (see 20, Fig. 8). Means for traversing the drum axially as it rotates are provided, so that the float may remain vertically under the same spot with respect to the instrument. This means comprises a sleeve 21 on which the drum $a$ is secured, the sleeve being slidable at one end thereof on the shaft $b$ and threaded at its opposite end on a stud $b'$ secured in the frame G (see Fig. 4), the pitch of the thread corresponding with the pitch of the helical groove formed on the drum for receiving the winding of the cord or cable $d$, so that as the drum is rotated by the winding or unwinding of the cable the threaded engagement of the fixed stud $b'$ and sleeve 21 will cause axial movement of the drum $a$, whereby the cable is always in direct vertical position above the float. A drum $g$ hereinafter referred to as the scale drum, receives a scale or chart $g'$ (Fig. 8) adapted to be wrapped on said scale drum, and means for rotating the scale drum by the rotation of the float drum are provided. Said means may comprise a drum $h$ mounted on a spindle $j$, hereinafter referred to as the "take up" drum, a worm $k$ on said spindle adapted to gear with a worm wheel $m$ on the scale drum, the cord $d$ on the float drum $a$ being adapted to be wound on to the "take up" drum $h$ as the ship is being loaded and vice versa as the ship is being unloaded, by the action of a counterweight or otherwise, the weight of the float causing the take-up drum to pay out the cord as the vessel rises, and means for traversing the said "take up" drum axially so that the cord may pass from one drum to the other evenly as the float drum $a$ is traversed. The traversing means is similar to that of the drum $a$; that is to say the drum $h$ is secured to a sleeve 22 which is slidable at its inner end on the shaft $j$, while its opposite end is threaded on a stud $j'$, so that as the drum $a$ moves axially the drum $h$ will move in unison therewith. A carrier or the like $q$ is adapted to be traversed longitudinally of said scale drum and carries a pointer $o'$ (Fig. 4) to indicate the tonnage of the ship on the fixed scale 18 hereinafter referred to; and a pencil or the like $o$ adjustable on the carrier is adapted to be traversed longitudinally of said scale drum and to place a record on the chart $q'$. Means for traversing said pencil $o$ and pointer $o'$ comprise a cord $p$ attached to the carrier $q$ on which the pencil $o$ is disposed, passed over a pulley $r$ mounted on the frame of the fixed scale 18 and thence to a pulley $r'$ on the axle of the scale drum $g$, to the rim of which latter pulley the cord is secured, the motion of the pencil $o$ being restrained by a counter balance weight $s$ connected by a cord $t$ to the carrier $q$ and pulling in a direction opposite from the cord $p$ attached to the pulley $r'$ and the weight $s$ tending to turn the drum $a$ in a contrary direction to the float $e$ so that the rope $d$ is always kept taut. A dial $v$ hereinafter referred to as the displacement scale dial indicates the displacement fore and aft by means of a pointer $w$ mounted on a rocking spindle or sleeve $x$ referred to hereafter as the driven rocking spindle disposed transversely of the ship said pointer being adapted to pass over said displacement scale dial $v$. The driven rocking spindle carries a toothed pinion 3, means being provided for rocking said spindle comprising a weight 4 (Fig. 5) mounted on a second rocking spindle or sleeve 5, referred to hereinafter as the driving rocking spindle, and a series of levers and connecting links, 6, 7, 8, 9, 10, and 11 adapted to move a toothed wheel 12 or the like gearing with the pinion 3 on the said driven rocking spindle. The levers 8 and 10 are pivoted at $8^a$ and $10^a$ respectively to the frame. The dial $v$ is rotatable and weighted by the pendulum weight 2 so as to maintain a fixed position in space despite the oscillations of the ship.

In order to correctly indicate the tonnage taken on or discharged from the ship, it is necessary to take into account the capacity of the ship for each inch of depth below load line, and for this purpose means are provided for varying the ratio of motion between the float and the scale drum. This may be effected by increasing the speed of the scale drum as the ship is loaded so that for each successive inch for instance, that the float suspension cord $d$ is wound up on the float drum $a$ the speed of the scale drum $g$ is increased. The means for effecting this increased speed may comprise a coned sleeve 13 of suitable form (Fig. 6), hereinafter referred to as the "compensator" adapted to be rotated by the cord as it passes from the float drum $a$ to the "take up" drum $h$, the rotation of the sleeve 13 causing it to travel axially so that motion is lost or gained by the variation in the length of the cord forming one turn round the said sleeve producing the desired ratio of motion to effect the correction.

The float drum $a$, take up drum $h$, scale drum $g$, driven rocking spindle $x$, driving rocking spindle 5, lever 6, 7, 8, 9, 10, 11, connecting rods and toothed wheel 12 are all mounted on a frame suspended from the suspension shaft F disposed longitudinally of the vessel, said shaft, as hereinbefore described, being vertically movable to adjust the position of the instrument with respect to the load lines on the vessel, a dial 16 and indicator 17 being provided to show the adjustment (Fig. 5'). The fixed scale 18 for indicating the tonnage in the ship, hereinafter referred to as the tonnage scale, is provided longitudinally of the scale drum $g$ the pointer $o'$ on the carrier $q$ indicating on the tonnage scale 18 the tonnage taken in the ship, this same indication being recorded by the pencil $o$ on the chart $q'$. The chart on the scale drum $g$ is provided with a diagonal band 19 over which the pencil $o$ travels as the scale drum is rotated, and the pencil moved longitudinally of the scale drum. The scale is accurately placed on the scale drum $g$ to a load line mark, and is preferably locked in a glass case. In order that the pencil may trace a new line when the ship is being unloaded, the glass case may be opened and the pencil moved with respect to the carrier longitudinally of the drum so that the trace made by the pencil will still indicate the correct tonnage on a fresh trace. The pencil can be moved longitudinally at each port to indicate the load taken in at each port. The scale can be removed from the scale drum by the captain and sent to the owner who will be able to read the amount of tonnage taken or discharged at each port. The scale 18 and scale on the chart g' are designed for every ship from the dead weight scale and length and breadth of the ship.

As best shown in Fig. 10, the coned sleeve 13 is mounted loosely on a fixed spindle 23 which carries a toothed pinion 24. On the coned sleeve 13 is an arm 25 provided with a nut adapted to engage a threaded spindle 27 on which is mounted a gear wheel 28 adapted to engage the fixed pinion 24 on the spindle 23.

In operation, the cord $d$ passing round the coned sleeve 13 causes the sleeve and the arm 25 to be rotated as the drums $a$ and $h$ rotate the gear 28, which constitutes an epicyclic train with the fixed pinion 24, rotating also, with its spindle 27, causing the nut to travel along the spindle 27 and thereby causing the cord $d$ to take a different position on the coned spindle and so compensate for the difference in capacity or tonnage for varying depth of the ship, the cord $d$ being always clear of the spindle 27. By this means, while the counter 42, operated by the sleeve 13 of the compensator, gains on the float drum as the cable travels towards the pointed end of said sleeve as the ship sinks deeper on being loaded, and thus indicates the tonnage, the take-up drum, scale drum, pointer $o$ and pencil $o'$ are displaced proportionately to the draught of the ship, the tonnage being read from the record by means of a scale on the chart.

In order to ascertain the list of the ship, I provide a pendulum 29 mounted on the shaft F. The pendulum carries a toothed rack 30 (Fig. 4) adapted to gear with a pinion 31 on a shaft 32, on which is mounted a pointer 33 which moves over a dial 34 fixed to the standard of the instrument and is graduated to show the list in inches or feet per width of beam.

The float $c$ is disposed in a pipe 35 (Fig. 7) which is suspended inside the ship from a suitable universal joint at a point opposite the load line mark. The tube extends downwards just below the light ship line and is connected by a small flexible tube not shown, but which may be attached to the nipple 35' to the outside water.

A counting mechanism 36 (Figs. 3 and 5) is adapted to be operated by suitable gearing, which has been omitted for the sake of clearness, from the shaft $b$ to indicate in feet the draft, the inches being shown on the dial $f$.

The counter 42 (Fig. 6) is adapted to be operated by the sleeve 13 of the compensator, to show the tonnage as the ship is loaded as above explained. This tonnage is also given by the pointer $o'$ and by the record on the scale drum. The float $c$ is provided with guide rollers 43. The pipe 35 is provided with guide rollers 44 which bear against a fixed guide 45 suitably mounted on the frame of the instrument.

The invention is particularly valuable to ship owners and also to those navigating the vessel inasmuch as the extent to which the vessel has been loaded or discharged at the various ports can be seen at a glance.

The instrument indicates the full capacity in fresh or cold water without fear of any mistakes. Ship owners can, on receipt of recording chart, see what the vessel has actually done on her voyage, the recording chart being so fixed on the drum that false recording is impossible.

The dead weight scale dial is marked to show the density of the water so that when a ship is fully loaded in salt water, the pointer $e$ moves to one side of the dial as the ship moves into fresh water, the hand moves clockwise until it arrives to a point marked fresh water. Conversely when loading a ship in salt water, the captain can see from the dial to what extent the ship can be loaded.

What I claim and desire to secure by Letters Patent is:—

1. An instrument for measuring and recording the tonnage on ships, comprising a rotatable scale drum, a reciprocable carrier adapted to traverse said scale drum, a float drum, a float secured to said float drum by means of a cord thereby to rotate the drum in one direction, means for transmitting the rotary motion of said float drum to said scale drum and to said carrier, and means for retracting the carrier thereby to cause rotation of the scale drum and float drum in the opposite direction.

2. An instrument for measuring and recording the tonnage on ships, comprising a rotatable scale drum, a reciprocable carrier adapted to traverse said scale drum, a float drum, a float secured to said float drum by means of a cord thereby to rotate the drum in one direction, means for transmitting the rotary motion of said float drum to said scale drum and to said carrier, means for retracting the carrier thereby to cause rotation of the scale drum and float drum in the opposite direction, and means for varying the ratio of motion between the float and the scale drum.

3. An instrument for measuring and recording the tonnage on ships, comprising a rotatable scale drum, a reciprocable carrier adapted to traverse said scale drum, a float drum, a float secured to said float drum by means of a cord thereby to rotate the drum in one direction, means for transmitting the rotary motion of said float drum to said scale drum and to said carrier, means for retracting the carrier thereby to cause rotation of the scale drum and float drum in the opposite direction, and means for varying the ratio of motion between the float and the scale drum, said means comprising an axially movable cone sleeve between the float drum and float and around which the float cord is wound.

4. An instrument for measuring and recording the tonnage on ships, comprising a rotatable scale drum, a reciprocable carrier adapted to traverse said scale drum, a float drum, a float secured to said float drum by means of a cord thereby to rotate the drum in one direction, means for transmitting the rotary motion of said float drum to said scale drum and to said carrier, means for retracting the carrier thereby to cause rotation of the scale drum and float drum in the opposite direction, and a take-up drum between said float and float drum.

5. An instrument for measuring and recording the tonnage on ships, comprising a rotatable scale drum, a reciprocable carrier adapted to traverse said scale drum, a float drum, a float secured to said float drum by means of a cord thereby to cause rotation of said float drum, means for transmitting the rotary motion of said float drum to said scale drum and to said carrier, and means for causing axial movement of said float drum during the rotation thereof.

6. The combination with an instrument for measuring and recording the tonnage on ships, of means for indicating displacement, means for indicating the list of the ship, and a suspension shaft from which all of said means are suspended.

In testimony whereof I have signed my name to this specification.

SOPHUS PETER BAHNSEN.